(12) United States Patent
Schmorde et al.

(10) Patent No.: US 10,536,111 B2
(45) Date of Patent: Jan. 14, 2020

(54) CARRIER APPARATUS WITH C-PROFILE MODULE CARRIER FOR SOLAR MODULES

(71) Applicant: Mounting Systems GmbH, Rangsdorf (DE)

(72) Inventors: Ayk Schmorde, Bestensee (DE); Mario Gebhardt, Berlin (DE); Mark Redel, Blankenfelde-Mahlow (DE)

(73) Assignee: Mounting Systems GmbH (DE)

( * ) Notice: Subject to any disclaimer, the term of this patent is extended or adjusted under 35 U.S.C. 154(b) by 0 days.

(21) Appl. No.: 15/881,976

(22) Filed: Jan. 29, 2018

(65) Prior Publication Data
US 2018/0234048 A1    Aug. 16, 2018

(30) Foreign Application Priority Data
Feb. 13, 2017 (DE) .......................... 10 2017 102 827

(51) Int. Cl.
*H02S 30/10* (2014.01)
*H02S 20/10* (2014.01)
(Continued)

(52) U.S. Cl.
CPC .............. *H02S 30/10* (2014.12); *F24S 25/12* (2018.05); *F24S 25/13* (2018.05); *F24S 25/636* (2018.05);
(Continued)

(58) Field of Classification Search
CPC .......... H02S 30/10; H02S 20/10; H02S 20/20; F24S 25/65; F24S 25/10; F24S 25/13;
(Continued)

(56) References Cited

U.S. PATENT DOCUMENTS 2,865,588 A * 12/1958 McCartney ............ B60Q 7/005
248/231.81
3,701,613 A * 10/1972 Turner .................. E04B 1/5818
403/387
(Continued)

FOREIGN PATENT DOCUMENTS

DE    202005008159 U1    8/2005
DE    202007012570 U1    1/2008
(Continued)

*Primary Examiner* — Patrick D Hawn
(74) *Attorney, Agent, or Firm* — Ware, Fressola, Maguire & Barber LLP

(57) ABSTRACT

A carrier apparatus for solar modules has a post, a crossmember profile mounted on the post, a C-profile module carrier with two profile flanges and a profile crosspiece connecting the two flanges and, in the profile crosspiece, a drilled hole for accommodating fastening means, and a connecting adapter, with a central crosspiece with a drilled hole and two legs arranged opposite one another in each case laterally on the central crosspiece and each has a main body in the form of a right-angled triangle, with the first cathetus fastened on the central crosspiece and on the second cathetus of which the main body opens out into a connecting extension with a drilled hole for accommodating fastening means, the connecting adapter fastenable on the crossmember profile via the connecting extension drilled hole, and fastenable on the C-profile module carrier via the central crosspiece drilled hole.

12 Claims, 7 Drawing Sheets

(51) Int. Cl.
*H01R 4/66* (2006.01)
*H02S 20/20* (2014.01)
*F24S 25/12* (2018.01)
*F24S 25/13* (2018.01)
*F24S 25/636* (2018.01)
*F24S 30/20* (2018.01)

(52) U.S. Cl.
CPC ............... *F24S 30/20* (2018.05); *H01R 4/66* (2013.01); *H02S 20/10* (2014.12); *H02S 20/20* (2014.12)

(58) Field of Classification Search
CPC .... F24S 25/636; F24S 25/12; F24S 2025/804; F24S 30/20; Y02E 10/47; H01R 4/66
See application file for complete search history.

(56) References Cited

U.S. PATENT DOCUMENTS

| | | | | | |
|---|---|---|---|---|---|
| 4,029,384 | A | * | 6/1977 | Reinwall, Jr. | H01R 4/245 439/397 |
| 4,341,029 | A | * | 7/1982 | Heard | G09F 7/18 248/230.8 |
| 4,461,370 | A | * | 7/1984 | Connell | B25H 1/06 182/153 |
| 4,659,044 | A | * | 4/1987 | Armstrong | F16M 13/02 114/343 |
| 5,109,646 | A | * | 5/1992 | Colonias | E04B 1/2608 248/300 |
| 5,364,312 | A | * | 11/1994 | Cunard | A63G 9/00 182/153 |
| 5,636,306 | A | * | 6/1997 | Mock | G02B 6/4416 385/100 |
| 6,384,314 | B1 | * | 5/2002 | Lund-Hansen | E06B 9/386 136/246 |
| 7,744,052 | B2 | * | 6/2010 | Wooten | A47B 96/061 248/220.1 |
| 8,167,258 | B1 | * | 5/2012 | Wentworth | E04B 1/2403 248/214 |
| 8,407,961 | B2 | * | 4/2013 | Kemple | F24S 25/70 52/506.03 |
| 8,480,330 | B2 | * | 7/2013 | Urban | F16B 7/0493 403/400 |
| 8,590,223 | B2 | * | 11/2013 | Kilgore | H01R 4/26 52/173.3 |
| 8,684,191 | B2 | * | 4/2014 | Hosey | H05K 7/1424 211/41.17 |
| 8,726,587 | B2 | * | 5/2014 | Nuernberger | H02S 20/00 52/173.3 |
| 8,757,567 | B2 | * | 6/2014 | Ciasulli | F24S 25/65 248/219.4 |
| 8,894,424 | B2 | * | 11/2014 | DuPont | H02S 40/36 439/95 |
| 9,472,866 | B1 | * | 10/2016 | Seelig | H01R 4/26 |
| 9,743,501 | B2 | * | 8/2017 | Ciasulli | F24S 25/65 |
| 10,020,773 | B2 | * | 7/2018 | Molina | H02S 20/23 |
| 10,094,596 | B2 | * | 10/2018 | McPheeters | H02S 20/00 |
| 10,158,323 | B2 | * | 12/2018 | Schulte | F24S 25/65 |
| 2004/0216399 | A1 | * | 11/2004 | Yamada | H02S 20/23 52/173.1 |
| 2008/0017772 | A1 | * | 1/2008 | Wooten | A47B 96/061 248/248 |
| 2008/0217496 | A1 | * | 9/2008 | Wooten | A47B 96/061 248/248 |
| 2008/0310913 | A1 | * | 12/2008 | Urban | F16B 7/0493 403/404 |
| 2010/0192505 | A1 | * | 8/2010 | Schaefer | A47B 96/14 52/653.2 |
| 2010/0276558 | A1 | * | 11/2010 | Faust | F24S 25/61 248/222.14 |
| 2011/0147553 | A1 | * | 6/2011 | Ostermeier | F16B 5/125 248/223.41 |
| 2011/0265860 | A1 | * | 11/2011 | Ciasulli | F24S 25/65 136/251 |
| 2012/0102854 | A1 | * | 5/2012 | Meier | F24S 25/33 52/173.3 |
| 2012/0285515 | A1 | * | 11/2012 | Sagayama | H02S 20/24 136/251 |
| 2013/0032200 | A1 | * | 2/2013 | Schnitzer | H02S 20/23 136/251 |
| 2014/0109954 | A1 | * | 4/2014 | Kanbara | H01L 31/042 136/251 |
| 2018/0234048 | A1 | * | 8/2018 | Schmorde | F24S 25/12 |

FOREIGN PATENT DOCUMENTS

| | | | | |
|---|---|---|---|---|
| JP | 11324259 | A | * 11/1999 | .............. F24S 25/61 |
| JP | 2015140625 | A | * 8/2015 | .............. F24S 25/65 |

* cited by examiner

CARRIER APPARATUS WITH C-PROFILE
MODULE CARRIER FOR SOLAR MODULES

CROSS REFERENCE TO RELATED
APPLICATIONS

This application claims priority under 35 USC § 119 to Germany Patent Application No. 102017102827.7 filed on Feb. 13, 2017, which application is hereby incorporated by reference in its entirety.

TECHNICAL FIELD

The invention relates to a carrier apparatus for solar modules and to a connecting adapter for fastening a C-profile module carrier.

BACKGROUND OF THE INVENTION

Carrier apparatuses for solar modules are used in order to fasten the solar modules on a substructure in a stable enough manner for them to withstand all external actions such as wind and snow loads and weathering influences and to keep the solar modules oriented optimally in relation to the position of the sun over the duration of their service life. Furthermore, costs dictate that carrier apparatuses which use as little material as possible are also desirable. Carrier apparatuses also serve to adapt the solar-module system to the respectively given terrain.

SUMMARY OF THE INVENTION

It is therefore an object of the invention to provide a carrier apparatus, and a connecting adapter for a C-profile module carrier, which meet the requirements in all respects in optimum fashion both as far as the adequate technical, physical and chemical properties required are concerned and as far as the economic factors required in the relevant market segment are concerned.

According to a first aspect, the invention relates to a carrier apparatus for solar modules, comprising
  at least one post and a crossmember profile mounted on the post,
  at least one C-profile module carrier in the form of a C profile which has two profile flanges and a profile crosspiece connecting the two profile flanges and, in the profile crosspiece, at least one drilled hole for accommodating fastening means, and
  at least one connecting adapter, which has a central crosspiece with at least one drilled hole and two legs which are arranged opposite one another in each case laterally on the central crosspiece and each have a main body in the form of a right-angled triangle of which the first cathetus is fastened on the central crosspiece and on the second cathetus of which the main body opens out into a connecting extension with at least one drilled hole for accommodating fastening means,
  wherein the connecting adapter can be fastened on the crossmember profile with the aid of fastening means, via the at least one drilled hole of the connecting extension, and can be fastened on the C-profile module carrier with the aid of fastening means, via the drilled hole of the central crosspiece.

The invention proceeds from the finding that, in comparison with box-shaped module carriers which are conventionally used in the sector of carrier apparatuses for solar modules, the C-profile module carrier involves considerably less material, and is therefore of considerably lower weight, although at the same time the open geometry renders it susceptible to torsion. The invention is also based on the finding that such torsion can be prevented with the aid of a connecting adapter according to the second aspect of the invention. The connecting adapter according to the invention has a central crosspiece with at least one drilled hole and two legs which are arranged opposite one another in each case laterally on the central crosspiece and have in each case a main body in the form of a right-angled triangle of which the first cathetus is fastened on the central crosspiece and on the second cathetus of which the main body opens out into a connecting extension with at least one drilled hole for accommodating fastening means. In particular the triangular shape of the main body of the legs and the possible fastening on either side of the crossmember profile via the connecting adapter provide here for optimized support of the C-profile module carrier on the crossmember profile. It is also the case that the central crosspiece of the connecting adapter in the carrier apparatus also supports the profile crosspiece of the C-profile module carrier and thus, in the installed state, safeguards the C profile against twisting. In the carrier apparatus according to the invention, the use of the connecting adapter according to the second aspect of the invention therefore ensures that torsional loading of the C-profile module carrier is minimized and there is no torsion, that is to say twisting, of the C-profile module carrier. A C profile is understood to mean a profile which, as seen in a cross-sectional view, has a C-shaped cross section.

In one embodiment of the carrier apparatus, the connecting adapter is fastened on the crossmember profile with the aid of fastening means, via the at least one drilled hole of the connecting extension, and is fastened on the C-profile module carrier with the aid of fastening means, via the drilled hole of the central crosspiece, and thus provides for a firmly connected and stable, but relatively lightweight, carrier apparatus which uses less material.

An advantageous embodiment of the carrier apparatus is one in the case of which the profile crosspiece of the C-profile module carrier contains at least one pair of drilled holes and the central crosspiece of the connecting adapter contains a round hole and an arcuate slot, and wherein a distance between the drilled holes of the pair of drilled holes corresponds to a distance between the round hole and the arcuate slot. This allows the connecting adapter to be fastened on the C-profile module carrier at two points and thus allows the C-profile module carrier to be better safeguarded against twisting on account of torsional moments. The combination of the pairs of holes in the connecting adapter and in the C-profile module carrier ensures, moreover, that the C-profile module carrier can be adjusted both in the longitudinal direction and in terms of lateral inclination. This provides for easy adaptation of the carrier apparatus to the terrain, in particular it is possible to set an inclination around +/−15°.

It is advantageous, in particular, if the pair of drilled holes comprises two drilled holes arranged in a mirror-symmetrical manner in relation to a center axis of the C-profile module carrier, as seen in the longitudinal direction. The mirror-symmetrical arrangement equalizes force transmission between the C-profile module carrier and connecting adapter and thus contributes to avoiding torsion. The drilled holes are advantageously slots. Slots can advantageously compensate for tolerances which occur in the system as a whole as a result of production and installation tolerances. The slots are advantageously arranged such that a longitudinal extent of the two slots runs in the longitudinal direction of the C-profile module carrier.

It is advantageous overall for a uniform loading and the avoidance of torsion if the C profile of the C-profile module carrier is designed to be mirror-symmetrical in relation to a center axis of the C-profile module carrier, as seen in the longitudinal direction.

In one embodiment, the profile crosspiece of the C-profile module carrier contains at least one bead running in a longitudinal direction of the C-profile module carrier. Such beads serve for reinforcing the C profile. In particular, it is advantageous if the at least one bead is arranged to be mirror-symmetrical in relation to the center axis of the C-profile module carrier, in the case of a single bead, therefore, in the center of the C-profile module carrier. This optimizes the dimensional stability of the C profile.

In one embodiment, the profile flanges have a plurality of slots arranged in a mirror-inverted manner in each case. Solar modules can be fastened directly thereon.

As an alternative, it is possible for solar modules to be fastened via resilient brackets, in particular in combination with end module holders or central module holders. One embodiment of the carrier apparatus preferably comprises at least one resilient bracket, wherein the resilient bracket has two bracket legs arranged essentially at right angles in relation to one another, and wherein a first bracket leg has formed on it two lugs which are bent out of a plane of the bracket leg and are designed in the form of two wings of an arrowhead, and wherein the profile crosspiece of the C-profile module carrier contains at least one accommodating slit for accommodating the at least one resilient bracket. In this embodiment, the resilient bracket can be introduced into the accommodating slit in the first instance laterally by way of the arrowhead, which is formed by the lugs and, for safety reasons, is preferably of blunt design. The lugs, which are bent out of the plane of the first bracket leg, then latch in and are supported on the profile crosspiece of the C-profile module carrier so as to lock the resilient bracket. It is preferably the case that the resilient bracket has, in the first bracket leg, a bore for accommodating a fastening element of an end module holder or of a central module holder, and the carrier apparatus also comprises at least one end module holder and/or central module holder for fastening a solar module on the C-profile carrier, the holder being fastened on the C-profile module carrier via the resilient bracket. Once the resilient bracket has been introduced into the slit, the individual modules can be positioned on the C-profile module carrier and fastened securely on the carrier apparatus by virtue of the fastening means of the respective end module holder or central module holder being tightened.

It is preferably the case that at least one grounding spike is arranged on a second bracket leg of the resilient bracket, at an end which is directed away from the first bracket leg. Grounding spikes can engage in the usually aluminum frames of the solar modules which are to be installed, and therefore ensure that the solar modules are grounded via the carrier apparatus. The accommodating slit preferably has an at least partially serrated inner surface. This also provides for grounding of the solar modules in the installed state.

In a further embodiment, the profile crosspiece contains a multiplicity of mirror-symmetrical pairs of slots, preferably at regular intervals from one another. The arrangement of a multiplicity of pairs of slots means that the system as a whole can be adapted in a flexible manner, as far as the distances between the carrier-apparatus posts and the number thereof are concerned, to the required conditions.

It is also preferred if at least two drilled holes, preferably at least two round holes, for fastening a module-carrier connector are arranged in a mirror-symmetrical manner at at least one end of the C-profile module carrier. Such a module-carrier connector is preferably designed in the form of a C profile, in particular of a C profile designed in a manner analogous to the C profile of the C-profile module carrier, and can be fastened in the drilled holes via fastening means. The module-carrier connector can be used to fasten two C-profile modules on one another and thus to provide a relatively long carrier apparatus. Designing the module-carrier connector in the form of a C profile results in good load-bearing capability of the connection; using the C profile of the C-profile module carrier makes it possible to provide the same load-bearing capability as possessed by the C-profile module carrier itself.

The connecting adapter preferably has on the central crosspiece, level with the second cathetus, a lug which is bent through 90° out of a plane of the central crosspiece. Via this lug, it is possible for the connecting adapter to stand on the crossmember profile during installation of the carrier apparatus, installation thus being simplified, and therefore to be more easily positioned and also supported on the crossmember profile. It is advantageous, in particular, if the lug of the connecting adapter is bent through 90° in the inward direction out of a plane of the central crosspiece. Inward here means that the lug projects into a space delimited by the legs and the central crosspiece.

It is also advantageous if a plurality of slots for accommodating fastening means are arranged in the respective connecting extension. In the event of a higher loading capability being required for the connecting locations, it is thus also possible to use a plurality of fastening elements on each side.

The connecting adapter is preferably designed to be mirror-symmetrical in relation to a center axis in the longitudinal direction of the central crosspiece. This also contributes to more uniform support and safeguarding against torsion of the C-profile module carrier and allows greater freedom during installation of the C-profile module carrier in conjunction with a symmetrical design of the C-profile module carrier, in that the C-profile module carrier can be installed in two directions.

It is preferably the case that parts of the carrier apparatus such as the post, the C-profile module carrier, the crossmember profile and/or connecting adapter are produced from pre-coated sheet steel. The use of sheet steel which has already been coated considerably shortens the duration over which the components are produced and supplied, since there is no need for subsequent zinc coating. In particular, coating with alloys of zinc/aluminum/magnesium, particularly preferably with a composition made up of zinc with 3.5% aluminum and 3% magnesium, is advantageous. Such coatings, while having a smaller layer thickness, provide a higher level of corrosion protection than conventional zinc-coating methods and therefore contribute to reducing the weight, while at the same time increasing the resistance, of the carrier apparatus.

The material thickness of the sheet steel used for the individual components of the carrier apparatus can be adapted in dependence on ambient conditions which influence the static properties of the carrier apparatus, for example prevailing wind load or weather influences. A preferred material thickness for the connecting adapter is 2.5 mm, and material thicknesses of 2.0 or 1.5 mm are preferred for the C-profile module carrier.

In further embodiments, the carrier apparatus comprises fastening means which have underhead toothing which is designed to ensure that, when the fastening means are installed, the respective fastening means provides for electrical potential equalization for grounding purposes. As a result of this type of screw-connection, tightening of the respective fastening means ensures that an electric current can flow without obstruction from the solar module into the ground (grounding). The use of fastening means with underhead toothing in the form of RIPP Lock®, locking or CONLOK® toothing is therefore particularly preferred. Fastening means may be, for example, self-tapping screws. It is also possible, however, to use blind rivets, in particular in cases where there is no need for electrical potential equalization.

In a preferred embodiment, the connecting adapter according to the second aspect of the invention has on the central crosspiece, level with the second cathetuses, a lug which is bent through 90° out of a plane of the central crosspiece and, in the central crosspiece, a round hole and an arcuate slot. The connecting adapter is preferably designed here to be mirror-symmetrical in relation to a center axis in the longitudinal direction of the central crosspiece.

BRIEF DESCRIPTION OF THE DRAWINGS

Further exemplary embodiments of the invention will be described hereinbelow with reference to the accompany drawings, in which.

DETAILED DESCRIPTION

Figure 1:
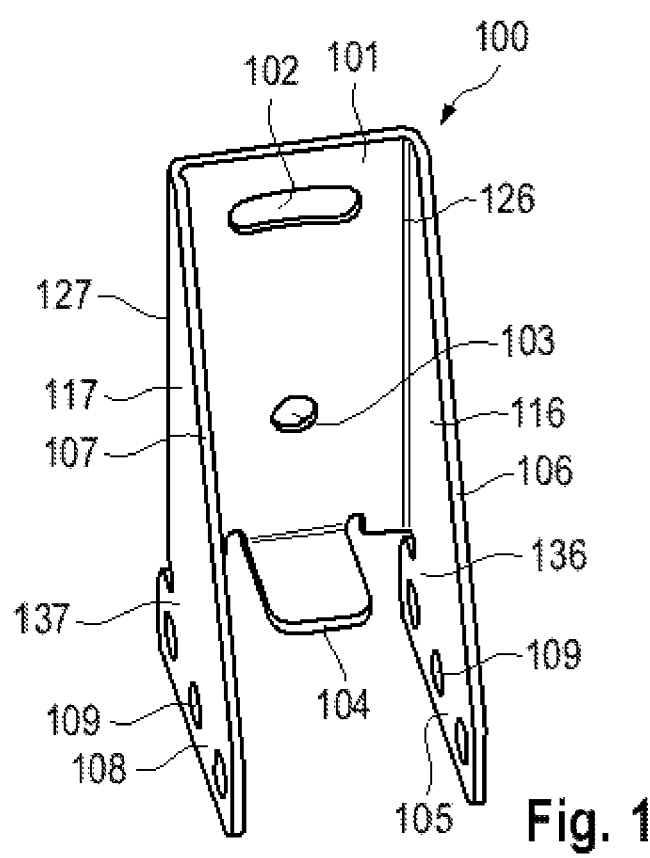
FIG. 1 shows a schematic illustration of an embodiment of a connecting adapter according to the second aspect of the invention.

FIG. 1 shows a schematic isometric illustration of a connecting adapter 100 according to the second aspect of the invention. The connecting adapter has a central crosspiece 101, which contains an arcuate slot 102 and a round hole 103. Both the round hole 103 and the arcuate slot 102 are arranged here in a mirror-symmetrical manner about a center axis, as seen in the longitudinal direction of the central crosspiece 101. In a carrier apparatus according to the first aspect of the invention, the round hole 103 serves as a point of rotation for a C-profile module carrier, whereas the inclination of the C-profile module carrier can be regulated via the arcuate slot 102.

The connecting adapter 100 also has two legs 106, 107 which are arranged opposite one another in each case laterally on the central crosspiece 101 and each have a main body 116, 117 in the form of a right-angled triangle of which the first cathetus 126, 127 is fastened on the central crosspiece 101 and on the second cathetus 136, 137 of which the main body opens out into a connecting extension 105, 108 with in each case three drilled holes 109 for accommodating fastening means. The connecting adapter 101 is of mirror-symmetrical design. The triangular shape of the main body gives rise to the legs having sloping sides. For more straightforward positioning of the connecting adapter on a crossmember profile of a carrier apparatus, a lug 104, which is bent at an angle of 90° in the inward direction, is arranged in the center of the central crosspiece, between the lateral legs. In the embodiment shown, the connecting adapter 100 is produced from pre-coated sheet steel.

Figure 2:
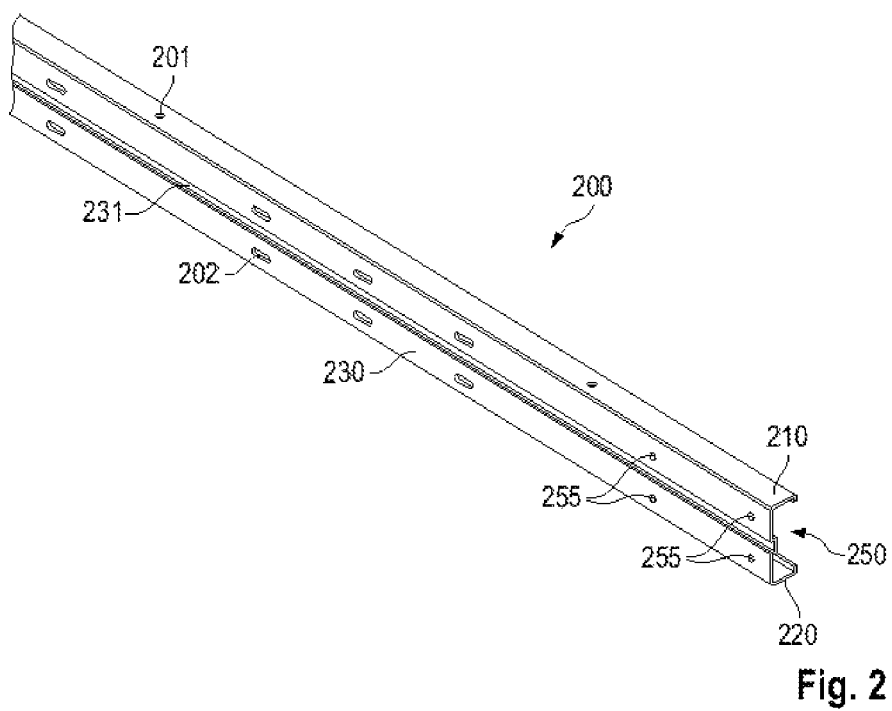
FIG. 2 shows a schematic isometric illustration of an embodiment of a C-profile module carrier of a carrier apparatus according to the first aspect of the invention.

FIG. 2 shows a schematic isometric illustration of an embodiment of a C-profile module carrier 200 of a carrier apparatus according to the first aspect of the invention.

The C-profile module carrier 200 is designed in the form of a C profile which has two profile flanges 210, 220 and a profile crosspiece 230 connecting the two profile flanges 210, 220 and, in the profile crosspiece 230, a plurality of pairs of drilled holes 202 for accommodating fastening means. The drilled holes 202 here are slots arranged in a mirror-symmetrical manner in relation to a center axis of the C-profile module carrier, as seen in the longitudinal direction. These slots can be used to fasten the C-profile module carrier on a connecting adapter according to the second aspect. The slots serve to provide improved adaptability of the carrier apparatus to given terrain. The C profile is designed to be mirror-symmetrical in relation to a center axis of the C-profile module carrier 200, as seen in the longitudinal direction. The profile crosspiece 230 of the C-profile module carrier 200 contains in its center, for reinforcing purposes, a bead 231 running in a longitudinal direction of the C-profile module carrier. The C module carrier 200 likewise consists of pre-coated sheet steel which, depending on the loading capability required, can have different optimal material thicknesses. Slots 201 are located at regular intervals in the profile flanges 210, 220 of the C-profile module carrier 200, and solar modules can be screwed directly to said slots.

Four drilled holes 255 in the form of round holes are arranged in a mirror-symmetrical manner at the end 250 of the C-profile module carrier 200 which is shown here. These drilled holes, or round holes, can be used to connect the C-profile module carrier 200 to a further C-profile module carrier by means of a module-carrier connector, which can be fastened in the drilled holes 255 via fastening means.

Figure 3:
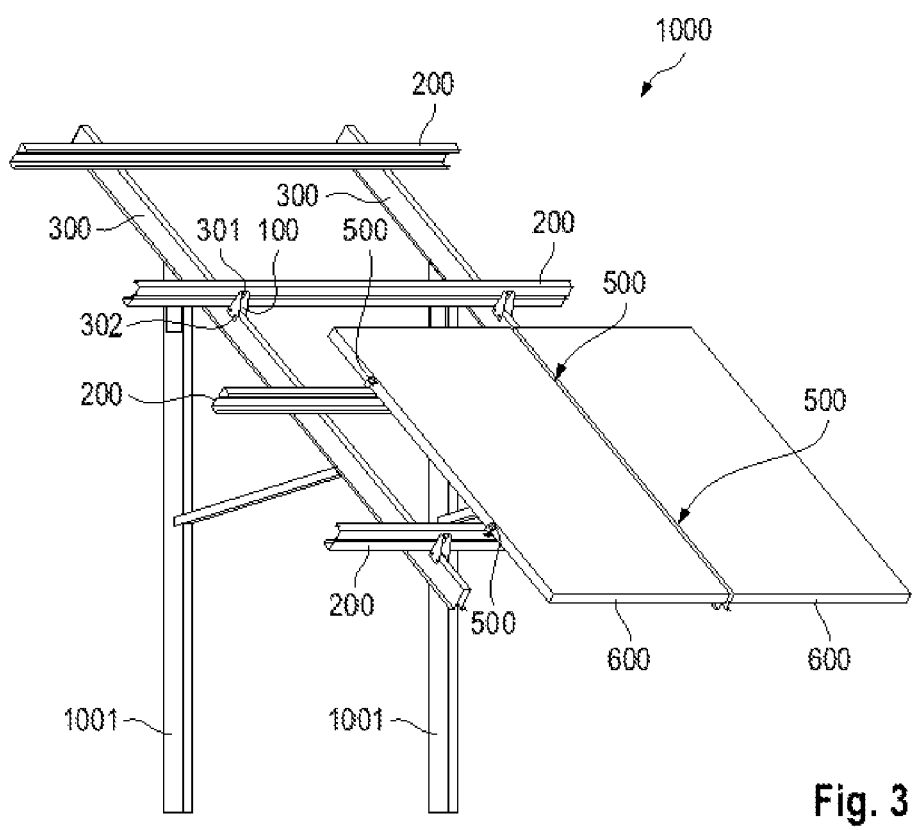
FIG. 3 shows a schematic isometric illustration of an embodiment of a carrier apparatus according to the first aspect of the invention.

FIG. 3 shows a schematic isometric illustration of an embodiment of a carrier apparatus according to the first aspect of the invention. The carrier apparatus 1000 comprises a plurality of posts 1001 and crossmember profiles 300 mounted thereon and also C-profile module carriers 200 in the form of a C profile which has two profile flanges and a profile crosspiece connecting the two profile flanges and, in the profile crosspiece at least one drilled hole for accommodating fastening means. The carrier apparatus 1000 also comprises connecting adapters 100, which each have a central crosspiece with at least one drilled hole and two legs which are arranged opposite one another in each case laterally on the central crosspiece and each have a main body in the form of a right-angled triangle of which the first cathetus is fastened on the central crosspiece and on the second cathetus of which the main body opens out into a connecting extension with at least one drilled hole for accommodating fastening means. The connecting adapters 100 here are fastened on the crossmember profile 300 with the aid of fastening means 302, via drilled holes of the connecting extension, and are fastened on the C-profile module carrier 200 with the aid of fastening means 301, via drilled holes of the central crosspiece, which will be described in detail with reference to FIGS. 4a and 4b which follow. Two solar modules 600 are fastened on the respective C-profile module carriers 200 via central module holders 500 and resilient brackets 400 fastened thereon, which will be described in detail with reference to FIGS. 6a and 6b which follow.

Figure 4A:
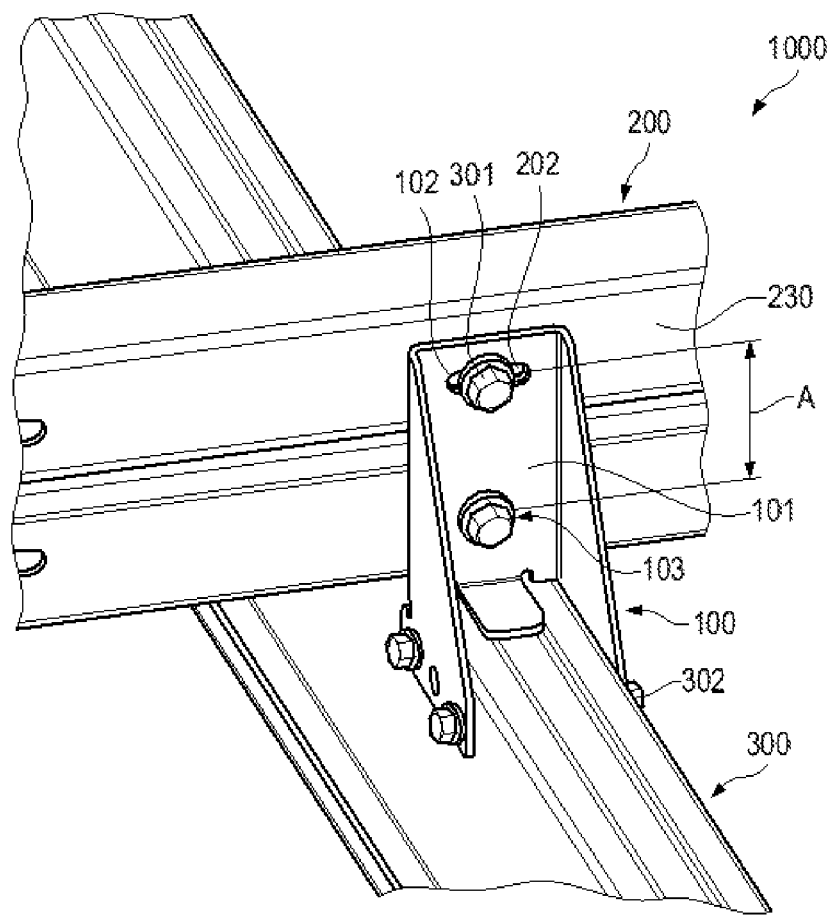
FIGS. 4a and b show schematic isometric illustrations of a detail of the carrier apparatus from FIG. 3.
Figure 4B:
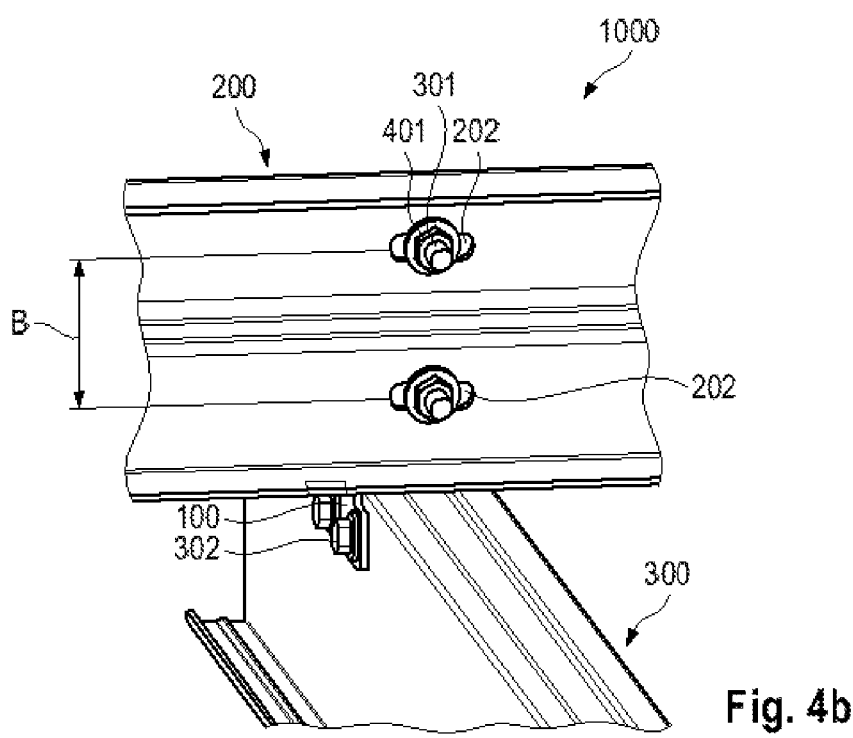

FIGS. 4a and 4b show a schematic isometric illustration of a detail of the carrier apparatus 1000 from FIG. 3 at a location where one of the connecting adapters 100 is connected to a crossmember profile 300 and a C-profile module carrier 200 is connected to the connecting adapter 100. FIG. 4a here is a front view, while FIG. 4b is the associated rear view.

The connecting adapter 100 is fastened on the crossmember profile 100 on either side of the crossmember profile 100 via fastening means 302. In the embodiment shown, use is made of two self-tapping screws 302. The screws have suitable underhead toothing which, during tightening, ensures that electrical potential equalization is provided for grounding purposes at this connecting location. Examples of such underhead toothings are given by RIPP Lock®, locking or CONLOK® toothing. The central crosspiece 101 of the connecting adapter 100 contains, in a manner similar to FIG. 1, a round hole 103 and an arcuate slot 102. The C-profile module carrier 200 has, in the profile crosspiece 230, a plurality of slots 202, which form pairs of drilled holes. The distance B between the slots 202 of a pair of drilled holes corresponds here to the distance A between the round hole 102 and the arcuate slot 103. The combination of the pairs of holes 102/103 in the connecting adapter and the pairs of holes 202 in the C-profile module carrier ensures that the C-profile module carrier can be adjusted both in the longitudinal direction and in terms of lateral inclination. This provides for easy adaptation of the carrier apparatus to the terrain, inclination of +/−15° being possible. The symmetrical and mirror-inverted arrangement of the pattern of holes means that the direction in which the C-profile module carrier is screwed to the connecting adapter is not important, and this simplifies installation. In order to fasten the C-profile module carrier 200 on the connecting adapter 100, the embodiment shown uses fastening means in the form of screws 301 and nuts 401, which have suitable underhead toothing to ensure, during tightening, that electrical potential equalization is likewise provided for grounding purposes at this connecting location. The connecting adapter 100, in the carrier apparatus 1000, ensures that the C-profile module carrier 200 is safeguarded against torsion and thus provides for a lightweight, and nevertheless stable, carrier apparatus which, in addition, can be easily adapted to the given terrain in particular via the slots 202 and the pair of holes made up of the round hole 103 and arcuate hole 102.

Figure 5:
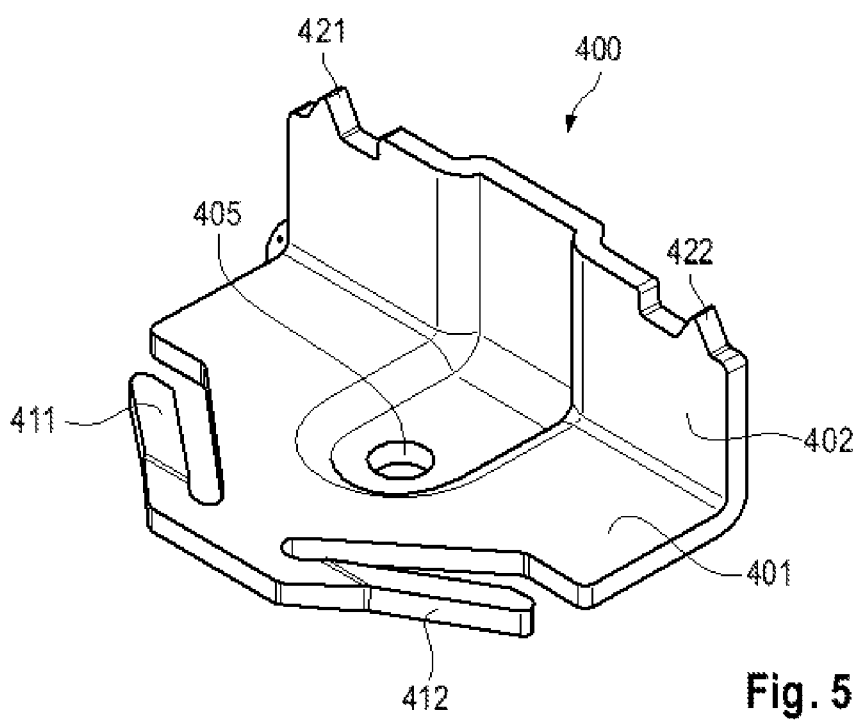
FIG. 5 shows a schematic illustration of a resilient bracket of an embodiment of a carrier apparatus according to the first aspect of the invention.

FIG. 5 shows a schematic illustration of a resilient bracket 400 of an embodiment of a carrier apparatus according to the first aspect of the invention. The resilient bracket 400 has two bracket legs 401, 402 arranged essentially at right angles in relation to one another. A first bracket leg 401 has formed on it two lugs 411, 412 which are bent out of a plane of the bracket leg and are designed in the form of two wings of an arrowhead. Two grounding spikes 421, 422 are arranged on a second bracket leg 402 of the resilient bracket, at an end which is directed away from the first bracket leg. These grounding spikes can engage in the usually aluminum frames of the solar modules which are to be installed. It is also the case in the exemplary embodiment shown here that a drilled hole 405 for accommodating a fastening means of an end module holder or of a central module holder is arranged in a depression in the first bracket leg.

Figure 6A:
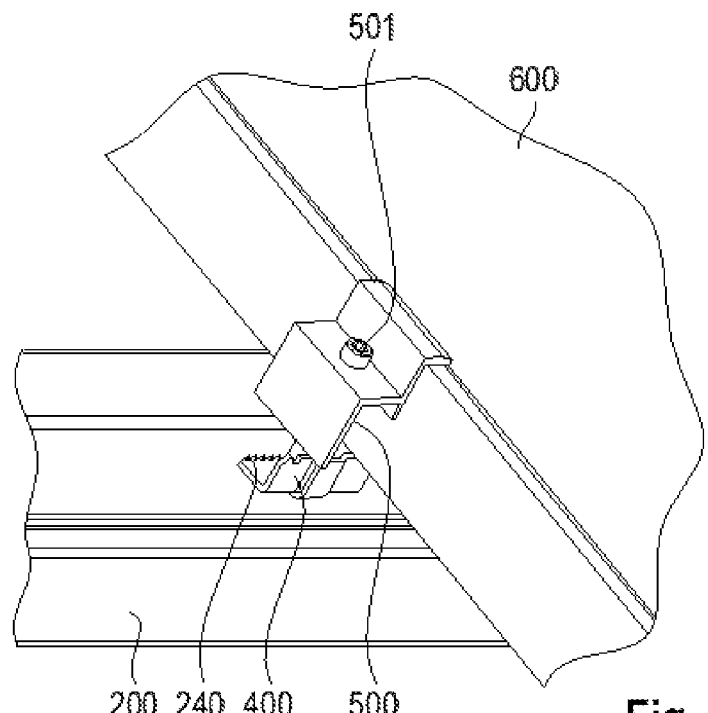
FIGS. 6a and b show schematic isometric illustrations of a detail of a carrier apparatus in the region of the module fastening.
Figure 6B:
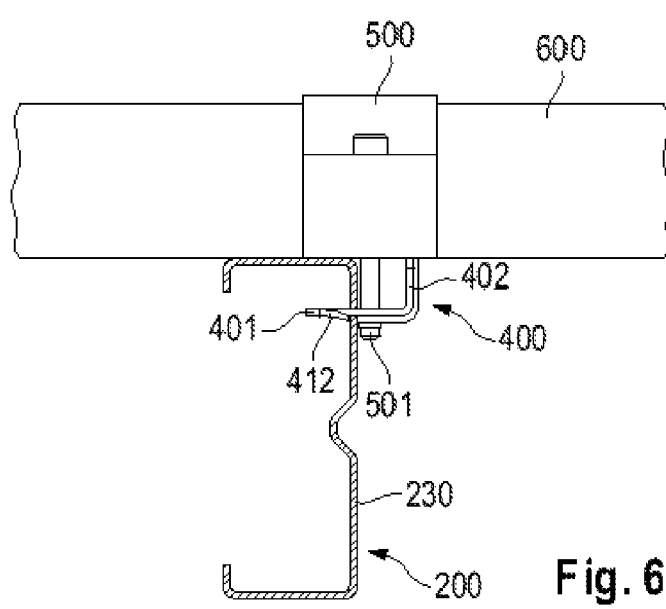

FIGS. 6a and 6b show schematic illustrations of details of a carrier apparatus in the module-fastening region, taken from different perspectives. A resilient bracket 400 has been introduced into an accommodating slit 240 of the C-profile module carrier 200 and a framed solar module 600 has been fastened on the carrier apparatus via the resilient bracket 400 and an end module holder, which is fastened on the resilient bracket 400 with the aid of a fastening means 501. The accommodating slit 240 has a partially serrated inner surface. It can clearly be seen in FIG. 6b that, following introduction into the accommodating slit, the lugs 411, 412, which are bent out of the plane of the first bracket leg, latch in and are supported on the profile crosspiece 230 of the C-profile module carrier 200 so as to lock the resilient bracket 400 in the C-profile module carrier 200 and thus to provide for secure fastening of the solar module on the C-profile module carrier.

What is claimed is:

1. A carrier apparatus for solar modules, comprising:
   at least one post and a crossmember profile mounted on the post,
   at least one C-profile module carrier in the form of a C profile which has two profile flanges and a profile crosspiece connecting the two profile flanges and, in the profile crosspiece, at least one drilled hole for accommodating fastening means,
   at least one connecting adapter, which has a central crosspiece with at least one drilled hole and two legs which are arranged opposite one another in each case laterally on the central crosspiece and each have a main body in the form of a right-angled triangle of which the first cathetus is fastened on the central crosspiece and on the second cathetus of which the main body opens out into a connecting extension with at least one drilled hole for accommodating fastening means,
   wherein the connecting adapter can be fastened on the crossmember profile with the aid of a fastening element, via the at least one drilled hole of the connecting extension, and can be fastened on the C-profile module carrier with the aid of a fastening element, via the drilled hole of the central crosspiece; and
   at least one resilient bracket, wherein the resilient bracket has two bracket legs arranged essentially at right angles in relation to one another, and wherein a first bracket leg has formed on it two lugs which are bent out of a plane of the bracket leg and are designed in the form of two wings of an arrowhead, and wherein the profile crosspiece of the C-profile module carrier contains at least one accommodating slit for accommodating the at least one resilient bracket.

2. The carrier apparatus according to claim 1, wherein the profile crosspiece of the C-profile module carrier contains at least one pair of drilled holes and the central crosspiece of the connecting adapter contains a round hole and an arcuate slot, and wherein a distance between the drilled holes of the pair of drilled holes corresponds to a distance between the round hole and the arcuate slot.

3. The carrier apparatus according to claim 2, wherein the at least one pair of drilled holes comprises two slots arranged in a mirror-symmetrical manner in relation to a center axis of the C-profile module carrier, as seen in the longitudinal direction.

4. The carrier apparatus according to claim 1, wherein the profile crosspiece of the C-profile module carrier contains at least one bead running in a longitudinal direction of the C-profile module carrier.

5. The carrier apparatus according to claim 1, wherein the profile crosspiece contains a multiplicity of mirror-symmetrical pairs of slots, at regular intervals from one another.

6. The carrier apparatus according to claim 1, wherein the resilient bracket has, in the first bracket leg, a bore for accommodating a fastening element of an end module holder or of a central module holder, and wherein the carrier apparatus also comprises at least one end module holder or central module holder for fastening a solar module on the C-profile carrier, the holder being fastened on the C-profile module carrier via the resilient bracket.

7. The carrier apparatus according to claim 1, wherein at least one grinding spike is arranged on a second bracket leg of the resilient bracket, at an end which is directed away from the first bracket leg.

8. The carrier apparatus according to claim 1, wherein the connecting adapter has on the central crosspiece, level with the second cathetuses, a lug which is bent through 90° out of a plane of the central crosspiece.

9. The carrier apparatus according to claim 8, wherein the lug of the connecting adapter is bent through 90° in the inward direction out of a plane of the central crosspiece.

10. The carrier apparatus according to claim 1, wherein the post, the C-profile module carrier, the crossmember profile or connecting adapter are produced from pre-coated sheet steel.

11. The carrier apparatus according to claim 1, wherein the respective fastening element has underhead toothing which is designed so as to ensure that the fastening element provides for electrical potential equalization for grounding purposes.

12. The carrier apparatus according to claim 11, wherein the underhead toothing is locking toothing.

* * * * *